United States Patent
Tsuchiya et al.

(10) Patent No.: US 6,724,943 B2
(45) Date of Patent: Apr. 20, 2004

(54) DEVICE AND METHOD FOR IMAGE PROCESSING

(75) Inventors: Takashi Tsuchiya, Tokyo (JP); Masami Ogata, Kanagawa (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 09/778,309

(22) Filed: Feb. 7, 2001

(65) Prior Publication Data

US 2001/0038716 A1 Nov. 8, 2001

(30) Foreign Application Priority Data

Feb. 7, 2000 (JP) .................................... P2000-034379

(51) Int. Cl.$^7$ ................................................ G06K 9/40
(52) U.S. Cl. ................. 382/261; 382/263; 382/264; 382/274; 382/275; 358/461; 358/463
(58) Field of Search .................. 382/255, 256, 382/260, 263, 264, 266, 269, 274, 275, 261; 358/447, 454, 461, 463; 348/606, 625

(56) References Cited

U.S. PATENT DOCUMENTS

| 5,422,827 | A | * | 6/1995 | Niehaus ....................... 702/190 |
| 5,717,789 | A | * | 2/1998 | Anderson et al. ............ 382/254 |
| 5,825,936 | A | * | 10/1998 | Clarke et al. ................ 382/261 |
| 6,005,983 | A | * | 12/1999 | Anderson et al. ........... 382/254 |
| 6,424,730 | B1 | * | 7/2002 | Wang et al. ................. 382/128 |

FOREIGN PATENT DOCUMENTS

| EP | 0997894 | 5/2000 |
| JP | 04177625 | 6/1992 |

* cited by examiner

Primary Examiner—Timothy M. Johnson
Assistant Examiner—Yosef Kassa
(74) Attorney, Agent, or Firm—Sonnenschein, Nath & Rosenthal, LLP (57) ABSTRACT

A device and a method for image processing make it possible to significantly improve the contrast and the sharpness of the whole image, in comparison with the ordinary. By amplifying the portions other than the edges, while conserving the edges with the pixel values which change abruptly out of input image data, it is possible to enhance and display the portions other than the edges, and so it is possible to significantly improve the contrast and the sharpness of the whole image, in comparison with the ordinary.

10 Claims, 12 Drawing Sheets

| a00 | 0 | a10 | 0 | a20 | 0 | a30 | 0 | a40 | 0 | a50 | 0 | a60 |
|---|---|---|---|---|---|---|---|---|---|---|---|---|
| 0 | 0 | 0 | 0 | 0 | 0 | 0 | 0 | 0 | 0 | 0 | 0 | 0 |
| a01 | 0 | a11 | 0 | a21 | 0 | a31 | 0 | a41 | 0 | a51 | 0 | a61 |
| 0 | 0 | 0 | 0 | 0 | 0 | 0 | 0 | 0 | 0 | 0 | 0 | 0 |
| a02 | 0 | a12 | 0 | a22 | 0 | a32 | 0 | a42 | 0 | a52 | 0 | a62 |
| 0 | 0 | 0 | 0 | 0 | 0 | 0 | 0 | 0 | 0 | 0 | 0 | 0 |
| a03 | 0 | a13 | 0 | a23 | 0 | a33 | 0 | a43 | 0 | a53 | 0 | a63 |
| 0 | 0 | 0 | 0 | 0 | 0 | 0 | 0 | 0 | 0 | 0 | 0 | 0 |
| a04 | 0 | a14 | 0 | a24 | 0 | a34 | 0 | a44 | 0 | a54 | 0 | a64 |
| 0 | 0 | 0 | 0 | 0 | 0 | 0 | 0 | 0 | 0 | 0 | 0 | 0 |
| a05 | 0 | a15 | 0 | a25 | 0 | a35 | 0 | a45 | 0 | a55 | 0 | a65 |
| 0 | 0 | 0 | 0 | 0 | 0 | 0 | 0 | 0 | 0 | 0 | 0 | 0 |
| a06 | 0 | a16 | 0 | a26 | 0 | a36 | 0 | a46 | 0 | a56 | 0 | a66 |

```
Filter A:            0.33 0.33 0.33
Filter B:       0.33 0.00 0.33 0.00 0.33
Filter C: 0.33 0.00 0.00 0.33 0.00 0.00 0.33
```

FIG. 15

DEVICE AND METHOD FOR IMAGE PROCESSING

RELATED APPLICATION DATA

The present application claims priority to Japanese Application No. P2000-034379 filed Feb. 7, 2000, which application is incorporated herein by reference to the extent permitted by law.

BACKGROUND OF THE INVENTION

1. Field of the Invention

This invention relates to a device and a method for image processing, and more particularly, is suitably applicable to, for instance, a video camera.

2. Description of the Related Art

Heretofore, in a video camera, as methods for improving the contrast (the difference between light and shade) and the sharpness (the clearness of the boundaries) of an image that has been captured by a solid state image sensing device (CCD: Charge Coupled Device), a contrast enhancing method by means of gray level transformation and/or a high-frequency components enhancing method wherein the contrast of the high-frequency components in an image is enhanced are known.

As the contrast enhancing method, a method that is called tone curve adjustment wherein the pixel level of each pixel of an image is converted by the use of a function that has the stated input-output relation (hereinafter, this is referred to as a level conversion function) and/or a method that is called histogram equalization wherein the level conversion function is adaptively changed in response to the frequency distribution of the pixel level have been proposed; besides, as the high-frequency components enhancing method, a method that is called unsharp masking has been proposed, wherein so-called outline enhancement is performed, that is, the edges of an image are extracted and then the extracted edges are enhanced.

By the way, in the contrast enhancing method, there has been such a problem that the contrast can be improved with respect to only partial brightness region out of the whole dynamic range (the difference between the maximum level and the minimum level) of an image, and also there has been such a problem that the contrast deteriorates contrarily, at the most bright portion and the most dark portion of the image in the case of tone curve adjustment, and at the vicinity of a brightness region that has little frequency distribution in the case of histogram equalization. Besides, in the high-frequency components enhancing method, there has been such a problem that the contrast of only high-frequency components of an image is enhanced, and so the vicinity of the edges of the image is enhanced unnaturally, and the image quality deteriorates unavoidably.

SUMMARY OF THE INVENTION

In view of the foregoing, an object of this invention is to provide a device and a method of image processing which can significantly improve the contrast and the sharpness of the whole image in comparison with the ordinary.

The foregoing object and other objects of the invention have been achieved by the provision of a device and a method of image processing which, while conserving the edges with the pixel values which change abruptly out of input image data, amplifies the portions other than the edges. It is thus possible to enhance the portions other than the edges and display.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 1:
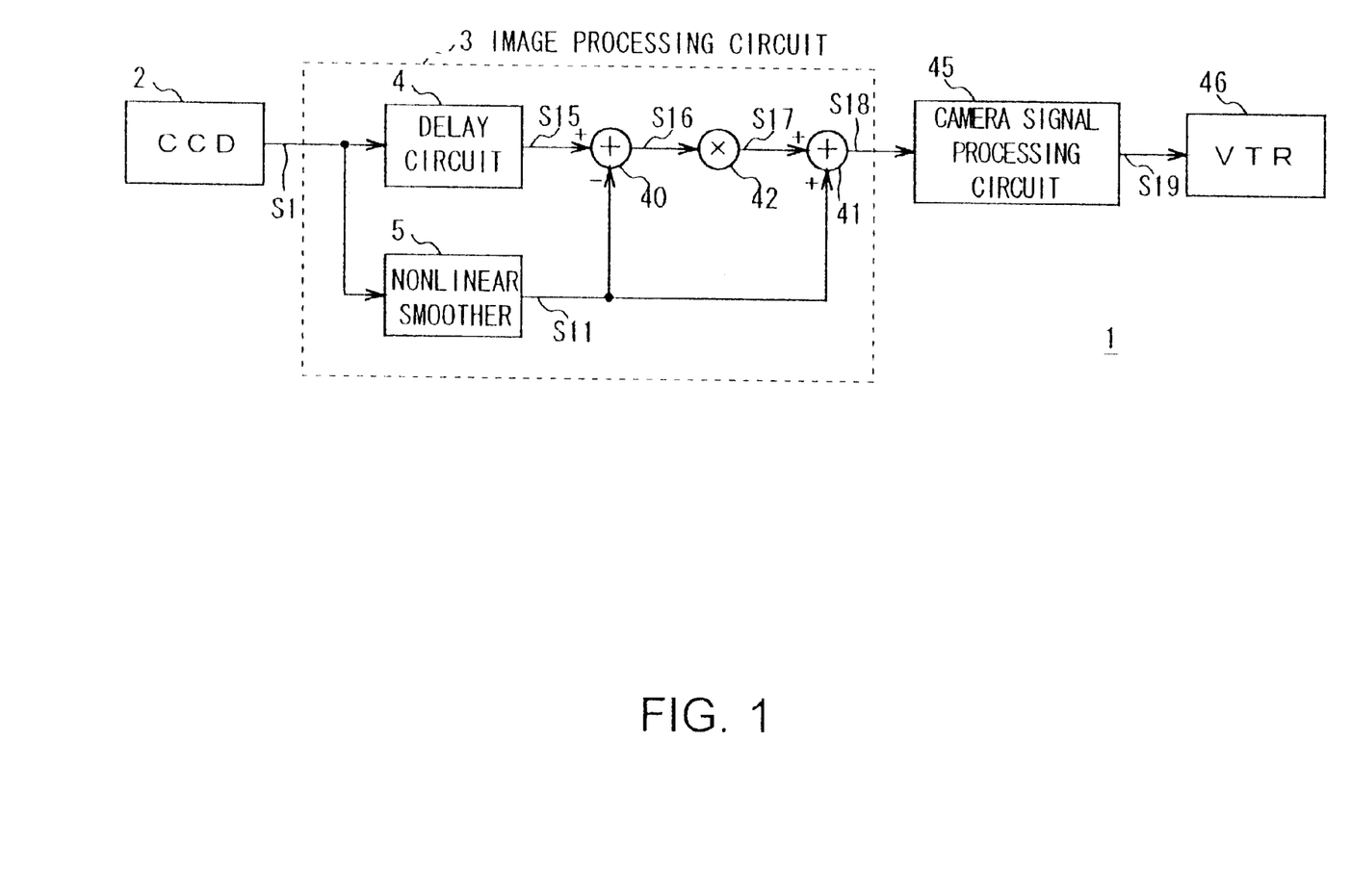
FIG. 1 is a block diagram showing the first embodiment of a video camera according to the present invention.

FIG. 1 shows a configuration of a video camera generally designated as 1 of the first embodiment, and an input image data S1 that has been captured by a solid state image sensing device (CCD: Charge Coupled Device) 2 is inputted to a delay circuit 4 and a nonlinear smoother 5 of an image processing circuit 3. Where the input image data S1 is a two-dimensional digital image, and the pixel value that is corresponding to the position (i, j) on the image is represented with x(i, j).

The nonlinear smoother 5 extracts the edge components, the pixel values of which change abruptly, out of this input image data S1, and outputs the edge components as it is without smoothing it, while smoothes the small-amplitude components other than the edge components, and hereby smoothes the input image data S1, conserving the edge components of the input image data S1.

Figure 2:
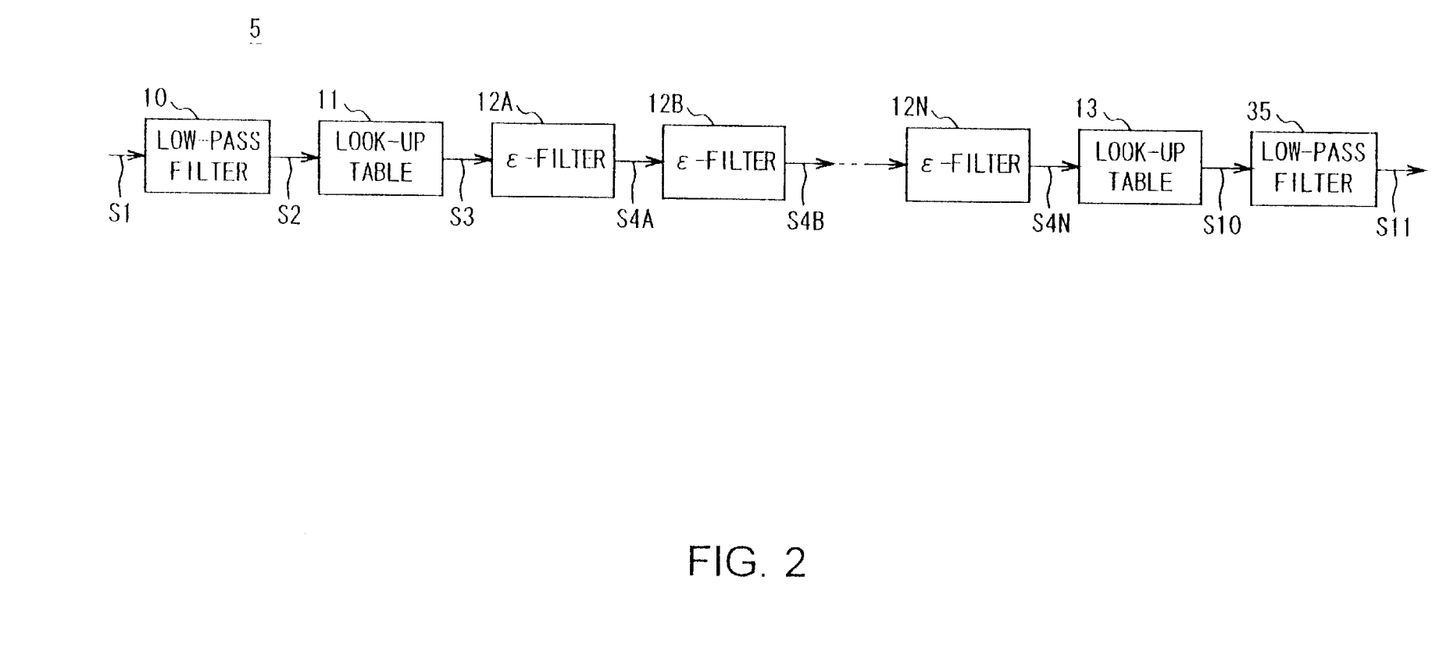
FIG. 2 is a block diagram showing a configuration of a nonlinear smoother.

To put it concretely, the nonlinear smoother 5 inputs the input image data S1 to a linear low-pass filter 10, as shown in FIG. 2. The linear low-pass filter 10 attenuates the signal level of the exceedingly high frequency components out of the input image data S1, and sends the resulted image data S2 to a look-up table 11. In this manner, by attenuating the signal level of the exceedingly high frequency components out of the input image data S1, the linear low-pass filter 10 prevents the high-frequency components having large amplitude from being not sufficiently smoothed and from surviving on the image as spot like noises, at the time when smoothing processing is performed by ε-filters 12 of the succeeding stages. In this connection, this linear low-pass filter 10 is composed by respectively applying one-dimensional linear low-pass filters to the horizontal direction and the vertical direction of the image, or composed of a two-dimensional linear low-pass filter.

The look-up table 11 applies gray level transformation like logarithm transformation to the image data S2, and sends the resulted image data S3 to an ε-filter 12A. Incidentally, the ε-filter 12A of the preceding stage performs adaptive smoothing process in accordance with the amplitude of image data. The amplitude of the image data generally grows higher in proportion to the intensity of lighting incident on the subject to be captured. So, by previously applying logarithm transformation to the image data S2, the look-up table 11 enables to obtain the same smoothing effects without reference to the condition of lighting, at the time when smoothing processing is performed on ε-filters 12 of the succeeding stages. In addition to this, by heightening the smoothing effect in, for instance, the dark region and/or the bright region of image, the look-up table 11 enables to control also the smoothing effect in accordance with the pixel value, such as increasing the degree of enhancement by the image enhancement processing on the succeeding stages.

The ε-filter 12A, which is a nonlinear smoothing filter, is a digital filter that is effective at smoothing the pixel value without hurting abrupt variation of the pixel value; it smoothes the image data S3, while conserving the edges of the image data S3 that is supplied from the look-up table 11, and then sends the resulted smoothed image data S4A to an ε-filter 12B. In the case where the pixel for filter processing is one-dimensional and 2N+1 tap, the smoothing processing at this ε-filter 12A is represented with the following equation $$y_n = \sum_{k=-N}^{N} a_k \cdot w_{n-k} \quad (1)$$

$$\sum_{k=-N}^{N} a_k = 1$$

when $|x_n - x_{n-k}| \leq \epsilon$, $w_{n-k} = x_{n-k}$ when $|x_n - x_{n-k}| > \epsilon$, $w_{n-k} = x_n$.

That is, the ε-filter 12A compares the absolute value $|x_n - x_{n-k}|$ of the difference between the pixel value $x_n$ of a central pixel $p_n$ and the pixel value $x_{n-k}$ of a pixel $p_{n-k}$ of filter processing with the stated threshold value ε. As a result of this, in the case where the ε-filter 12A has judged that the absolute value $|x_n - x_{n-k}|$ is smaller than the stated threshold value ε, the ε-filter 12A substitutes the pixel value $x_{n-k}$ for $w_{n-k}$, executes the same processing as that of the ordinary linear low-pass filter having $a_k$ as each tap coefficient, and hereby uniformly smoothes the image treating the central pixel $p_n$ as the center.

On the other hand, in the case where the ε-filter 12A has judged that the absolute value $|x_n - x_{n-k}|$ is larger than the stated threshold value ε, the ε-filter 12A substitutes the pixel value $x_n$ for $w_{n-k}$, replaces the pixel value $x_{n-k}$ of a pixel $p_{n-k}$ with the pixel value $x_n$ of the central pixel $p_n$, then performs low-pass filter process treating the central pixel $p_n$ as the center, and hereby performs smoothing with only pixel values of the vicinity of the pixel value $x_n$, ignoring the pixel value $x_{n-k}$.

Figure 3:
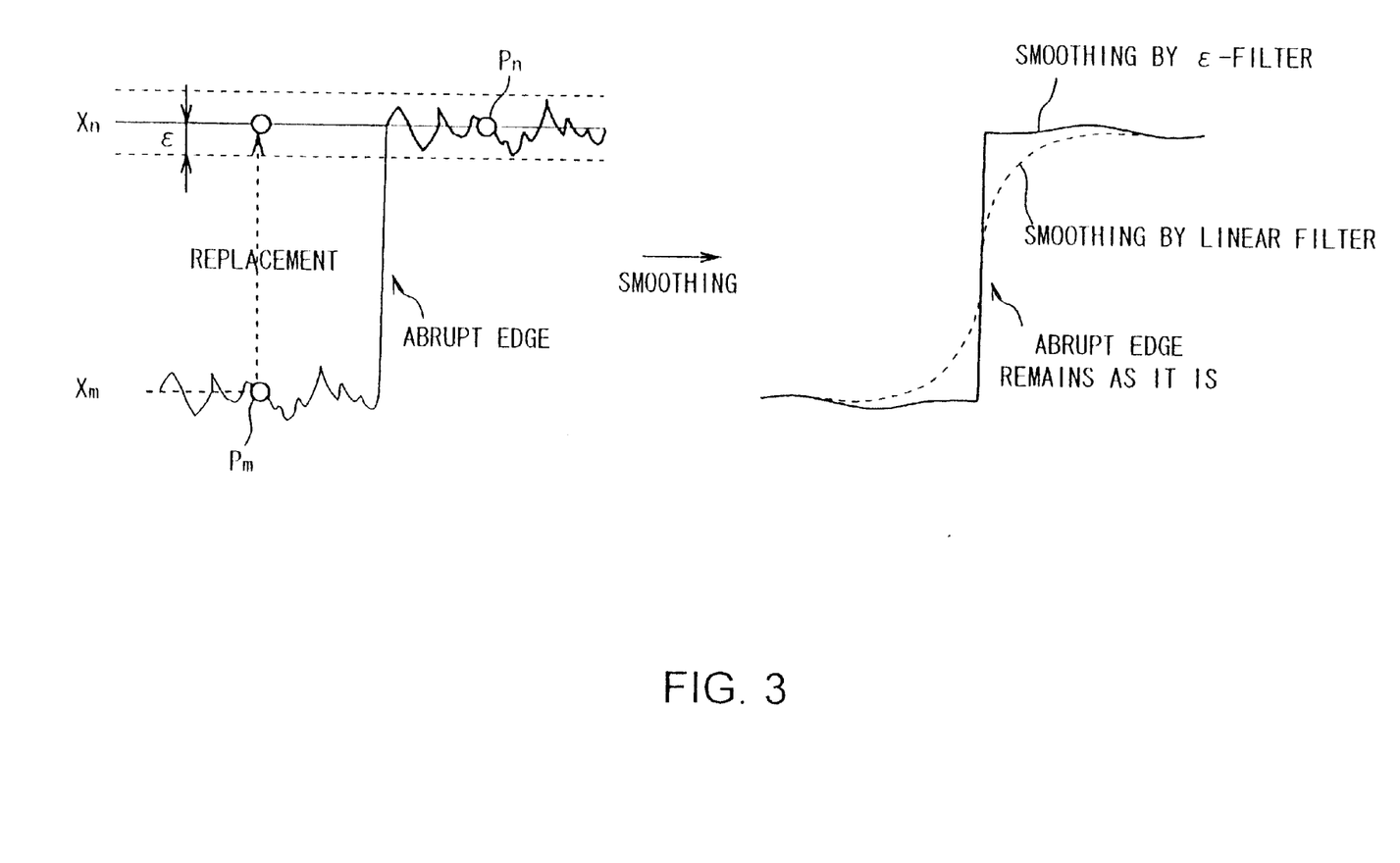
FIG. 3 is a schematic diagram used for explaining the operation of the $\epsilon$-filter.

As shown in FIG. 3 for instance, in the case where the absolute value of the difference of the pixel values that are preceding and succeeding the abrupt edge exceeds the stated threshold value ε, when the ε-filter 12A performs low-pass filter process treating the central pixel $p_n$ as the center, it replaces the pixel value $x_m$ of a pixel $p_m$ with the pixel value $x_n$ of the central pixel $p_n$ and applies low-pass filter process, and hereby smoothes at the vicinity of the pixel value $x_n$; on the other hand, when the ε-filter 12A performs low-pass filter process treating the central pixel $p_m$ as the center, it smoothes at the vicinity of the pixel value $x_m$.

At this time, with respect to a pixel p of such an edge portion that there is not a pixel p having a near pixel value x within a range of filter processing, the ε-filter 12A outputs the pixel value x of the pixel p of the edge portion almost as it is, and so the abrupt change of the edge is conserved as it is. In this connection, as with the linear low-pass filter 10, there are the case where the ε-filter 12A is composed by respectively applying one-dimensional ε-filters to the horizontal direction and the vertical direction of the image, and the case where it is composed of a two-dimensional ε-filter.

By the way, on the succeeding stages of the ε-filter 12A, ε-filters 12B to 12N that have the same configuration as that of the ε-filter 12A are sequentially connected, so as to improve the smoothing effect by sequentially applying smoothing process to the smoothed image data S4A. In this way, the smoothed image data S4N whose components other than edges have been sufficiently smoothed is obtained and then supplied to a look-up table 13 of the succeeding stage.

Figure 4:
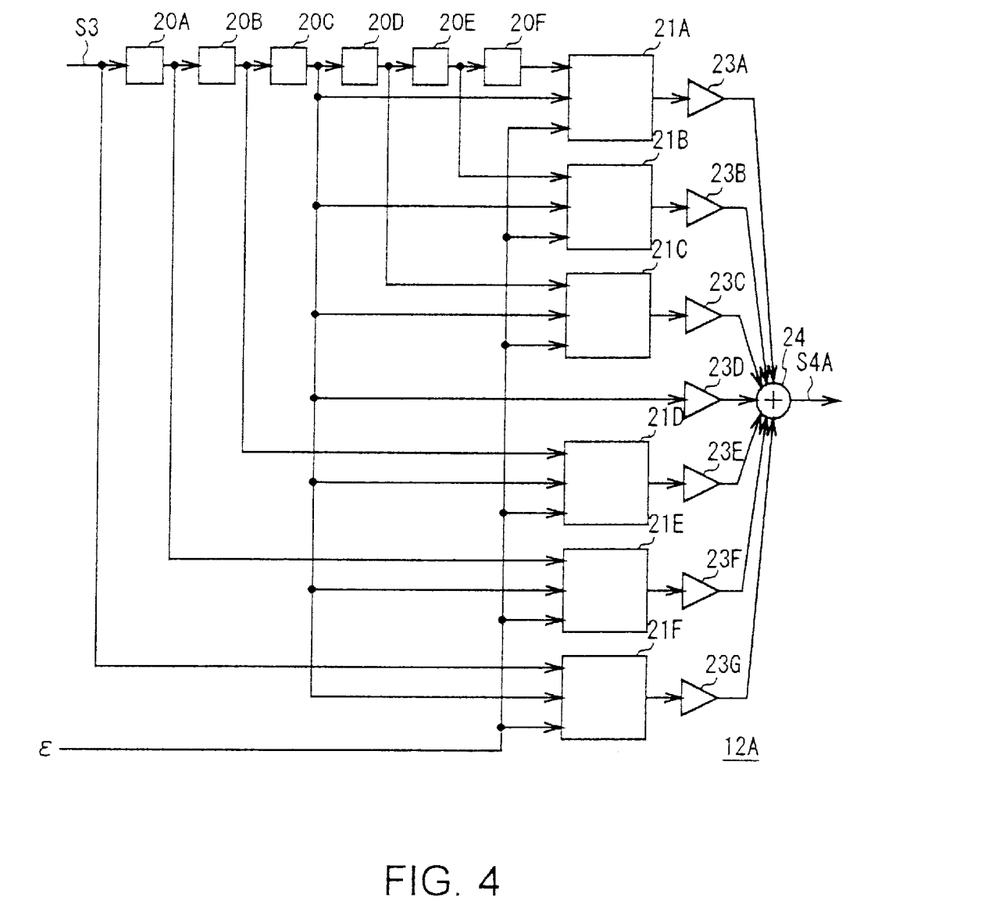
FIG. 4 is a block diagram showing a configuration of the $\epsilon$-filter.
Figure 5:
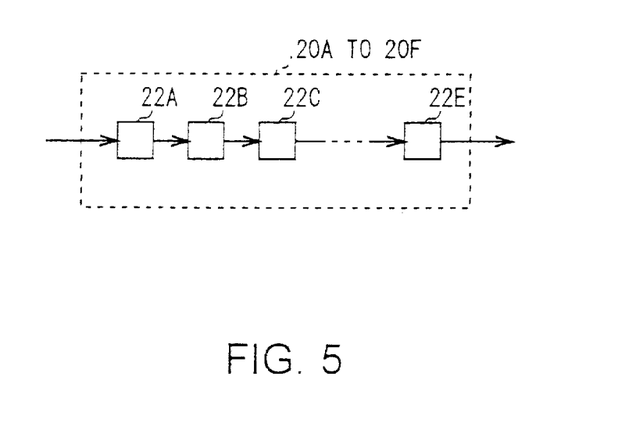
FIG. 5 is a block diagram showing a configuration of the register sequence.

At here, FIG. 4 is showing a configuration of the ε-filter 12A of the case where the pixel for filter processing is one-dimensional and 7-tap, and comprised of register sequences 20A to 20F, selectors 21A to 21F, amplifiers 23A to 23G, and an adder 24. As shown in FIG. 5, the register sequences 20A is comprised of registers 22A to 22E connected in series, each of which retains a pixel value of 1 pixel; the register sequences 20B to 20F are composed in a same manner as the register sequences 20A.

Figure 6:
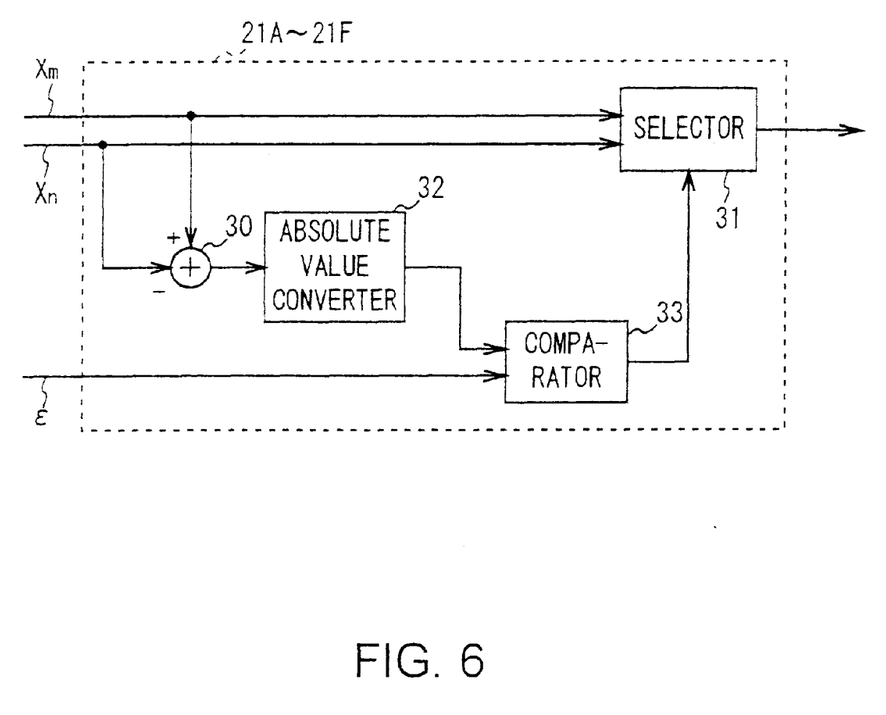
FIG. 6 is a block diagram showing a configuration of the selector.

As shown in FIG. 6, the selector 21A inputs the pixel value $x_n$ of a central pixel $p_n$ shown in FIG. 3 for instance to an adder 30 and a selector 31, and also inputs the pixel value $x_m$ of a pixel $p_m$ to the adder 30 and the selector 31. The adder 30 finds the difference between the pixel value $x_n$ and the pixel value $x_m$, and sends the result to an absolute value converter 32. The absolute value converter 32 finds the absolute value $|x_n - x_m|$ of the difference between the pixel value $x_n$ and the pixel value $x_m$, and sends this to a comparator 33.

The comparator 33 compares this absolute value $|x_n - x_m|$ with the stated threshold value ε, and sends the result of this comparison to the selector 31. In the case where the absolute value $|x_n - x_m|$ is smaller than the stated threshold value ε, the selector 31 chooses the pixel value $x_m$ and sends it to the amplifier 23A of the succeeding stage; on the other hand, in the case where the absolute value $|x_n - x_m|$ is larger than the stated threshold value ε, it chooses the pixel value $x_n$ and sends it to the amplifier 23A of the succeeding stage.

Each selector 21B to 21F, which has the same configuration as that of the selector 21A, sends the pixel value x of the chosen pixel P to the corresponding one of the amplifiers 23B and 23C as well as 23E to 23G of the succeeding stages. As to the amplifier 23D, the pixel value $x_n$ of the central pixel $P_n$ would be supplied to it from the register sequence 20C.

The amplifiers 23A to 23G are adapted to multiply inputted pixel values x by a tap coefficient $a_k$ respectively, send the result of the calculation to the adder 24 respectively, add in the adder 24, and then send this to the -filter 12B as the smoothed image data S4A.

Figure 14:
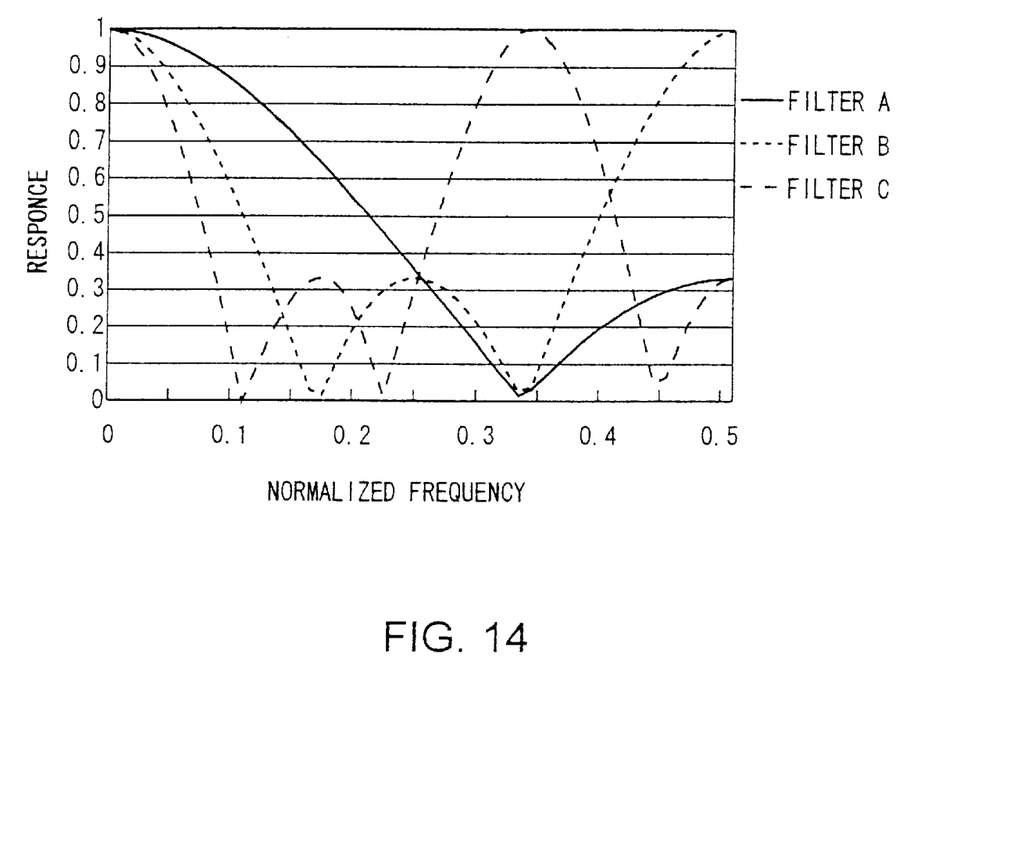
FIG. 14 illustrates the relation between the number of registers 22 and the frequency response.
Figure 15:
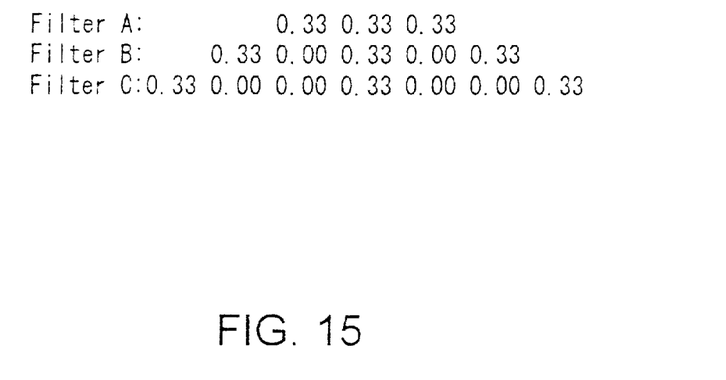
FIG. 15 illustrates the coefficients of the filters corresponding to the frequency response in FIG. 14.

In this smoothing process, it is desired that an image with least possible change be generated in parts other than the edges, which requires such large filters in the ε-filter 12A. However, with the large filters, when all pixels have been multiplied by the tap coefficient $a_k$, the circuit scale becomes large, because the numbers of the selectors 21A to 21F and/or the amplifiers 23A to 23G of the succeeding stages must be increased as well. And so, like the present embodiment, by composing each register sequence 20 with the registers 22 for several pixels respectively, and applying the succeeding operation process to only the foremost 1 pixel of each register sequence 20, a ε-filter that covers a wider range of space is made possible without increasing the circuit scale of the succeeding stages. For example, the number of registers 22 being two for the 7-tap ε-filter, it is possible to compose a filter with 13 pixels×13 pixels of the same circuit scale. In this way, high smoothing effects can be expected in a filter having a coefficient which is valid only for every several pixels. However, since this generally makes the side lobe larger, unnecessary high frequency components are apt to remain in smoothed image data. FIG. 14 shows the comparison of frequency response of filters composed with the number of the register 22 changed. The horizontal axis indicates normalized frequency with Nyquist frequency being 0.5, and the vertical axis indicates frequency response of the filters. The filters A, B and C correspond to when the number of registers being one, two and three respectively. Actual filter coefficients of each filter are shown in FIG. 15. As understood from FIG. 14, the more the number of registers 22 the more the side lobe increases. In order to avoid this problem, in the present embodiment, by connecting in series a plurality of ε-filters 12A to 12N that have the same composition except for the number of registers 22 in the register sequences 20A to 20F, both smoothing effects and control of the side lobe are attained. The ε-filter with more registers 22 provides high smoothing effects, and the ε-filter with fewer registers 22 eliminates unnecessary high frequency components that passed through the side lobes of the other filters. Because of the behavior of the ε-filter that lets the high frequency components pass through around the edges, if the ε-filter with fewer registers 22 is used first, the high frequency components that passed through its main lobe could not be sufficiently attenuated around the edges by the ε-filters of the succeeding stages. Therefore, for adequate smoothing effects, it is preferable that the ε-filters with more registers 22 be applied in order.

The look-up table 13 applies the inverse transformation of the logarithm transformation, which has been applied by the look-up table 11, to the smoothed image data S4N that is supplied from the ε-filter 12N, and sends the resulted smoothed image data S10 to a linear low-pass filter 35. By slightly dulling the edges of the smoothed image data S10, which have been smoothed while conserving the edges, the linear low-pass filter 35 creates a smoothed image data S11, and sends this to adders 40 and 41 (FIG. 1). By this, it is possible to retain smoothness of the image at the vicinity of the edges, in image enhancement processing of the succeeding stage.

Returning to FIG. 1, the delay circuit 4 makes the input image data S1, which have been captured by the CCD 2, delay by the stated quantity, and then sends this to the adder 40 as a delayed image data S15. The adder 40, which comprises an image enhancing means along with the adder 41 and a multiplier 42, subtracts each pixel value s(i, j) of the smoothed image data S11 from each pixel value x(i, j) of the delayed image data S15, and sends the resulted differential image data S16 to the multiplier 42.

The multiplier 42 multiplies each pixel value (x(i, j)−s(i, j)) of the differential image data S16 by a gain coefficient g(i, j) respectively and amplifies, and then sends the resulted differential image data S17 to the adder 41. At here, a value that is uniform toward the whole screen or a value that has been set for each pixel (i, j) is used as the gain coefficient g(i, j).

The adder 41 adds each pixel value s(i, j) of the smoothed image data S11, which corresponds to the offset of subtraction by the adder 40, to each pixel value g(i, j)×(x(i, j)−s(i, j)) of the differential image data S17 that is supplied from the multiplier 42, and then sends the resulted output image data S18 to a camera signal processing circuit 45. The camera signal processing circuit 45 applies the stated data processing to the output image data S18, and then sends and records the resulted output image data S19 onto a Video Tape Recorder (VTR) 46.

Each pixel value y(i, j) is represented by the following equation $$y(i, j) = g(i, j) \times (x(i, j) - s(i, j)) + s(i, j) \qquad (2)$$

In this equation (2), upon replacing the gain coefficient g(i, j) with a gain coefficient G that is uniform for the whole screen, and also replacing each pixel value s(i, j) of the smoothed image data S11 with the central value of the dynamic range of the input image data S1 or the average value C of all pixel values, this equation (2) is represented as the following equation $$y(i, j) = G \times (x(i, j) - C) + C \qquad (3)$$

that is showing a contrast enhancing method based on the conventional tone curve adjustment.

Besides, in the above-mentioned equation (2), upon replacing the gain coefficient g(i, j) with the gain coefficient G that is uniform for the whole screen, and also replacing each pixel value s(i, j) of the smoothed image data S11 with each pixel value f(i, j) of such image data that linear low-pass filter processing have been applied to each pixel value x(i, j) of the input image data S1, this equation (2) is represented as the following equation $$y(i, j) = G \times (x(i, j) - f(i, j)) + f(i, j) \qquad (4)$$

that is showing a high-frequency components enhancing method based on the conventional unsharp masking.

Like this, the conventional contrast enhancing method is a method of performing image enhancing process independently for each pixel of image, and the conventional high-frequency components enhancing method is a method of performing image enhancing process on the basis of the relative level difference with the peripheral pixels that exist at the periphery of the central pixel; on the other hand, the method of the present embodiment is integrating the conventional contrast enhancing method and high-frequency components enhancing method by the use of the nonlinear smoothing filter, and capable of image enhancement processing of remarkably higher grade.

In the above configuration, the image processing circuit 3 smoothes the input image data S1 with the nonlinear smoother 5 while conserving the edges of the input image data S1, and generates the smoothed image data S11. And, the image processing circuit 3 subtracts this smoothed image data S11, as that which is corresponding to the offset, from the delayed image data S15 that is the original image, multiplies the result of the subtraction by the gain coefficient, and then adds the smoothed image data S11 which is corresponding to the offset.

Therefore, it is possible to enhance the signal level of the small-amplitude components other than the edge components while conserving the edge components out of the input image data S1, in this way, it is possible to improve the contrast of the whole image while maintaining the dynamic range of the image, and also possible to improve the sharpness of the image at also the vicinity of the edge. By this, the video camera 1 is able to capture sharp images wherein the dynamic range and the contrast are secured, even if the shooting is performed in a fog or even the case of a vague distant view, and also able to perform high-grade image enhancement processing.

According to the above configuration, by smoothing the input image data S1 while conserving the edge components of the input image data S1, thereby creating the smoothed image data S11, and then subtracting the smoothed image data S11 from the input image data S1 as that which is corresponding to the offset, and multiplying the result of the subtraction by a gain coefficient and adding the smoothed image data S11 to it, it is possible to enhance the signal level of the small-amplitude components other than the edge components out of the input image data S1, while conserving the edge components, in this way, it is possible to substantially improve the contrast and the sharpness of the whole image, in comparison with the usual, while maintaining the dynamic range of the image.

(2) Second Embodiment

Figure 7:
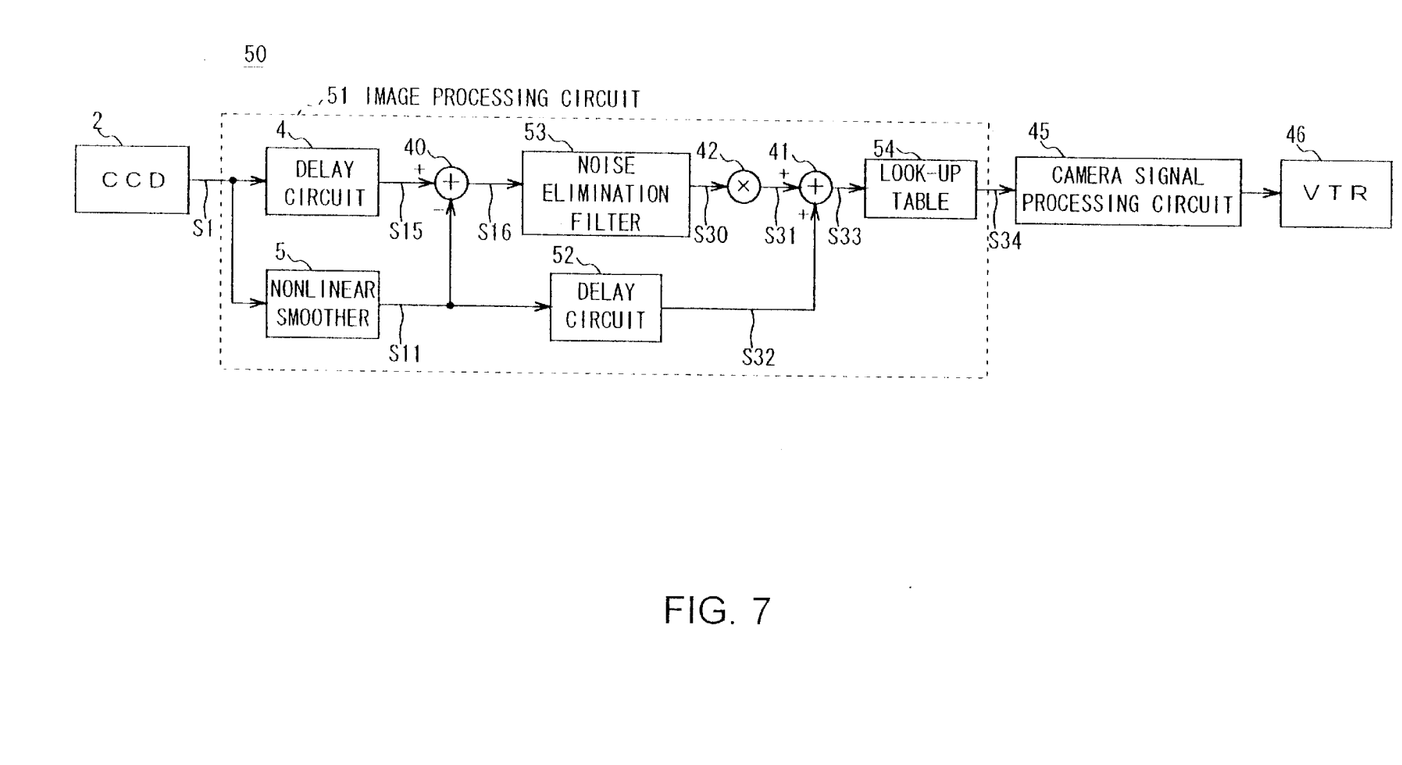
FIG. 7 is a block diagram showing a configuration of a video camera of the second embodiment.

FIG. 7, which has the same reference numerals as those of FIG. 1 on its portions corresponding to the portions of FIG. 1, is showing a video camera 50 of the second embodiment, and comprised in a same way as the video camera 1 of the first embodiment, excepting the configuration of an image processing circuit 51.

In the case of this embodiment, the nonlinear smoother 5 sends the smoothed image data S11 to the adder 40 and a delay circuit 52. The adder 40 subtracts the smoothed image data S11 from the delayed image data S15, and sends the resulted differential image data S16 to a noise elimination filter 53.

Figure 8:
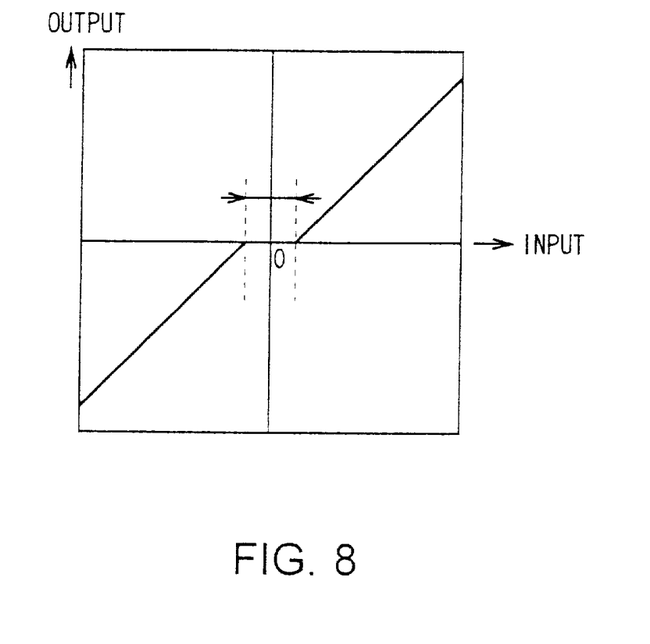
FIG. 8 is a schematic diagram used for explaining the input/output characteristics of the noise elimination filter.

The noise elimination filter 53 reduces the noise components of the differential image data S16, and sends the resulted differential image data S30 to the multiplier 42. The noise elimination filter 53, which has the input/output characteristics such as what is shown in FIG. 8, performs gray level transformation called coring, wherein it do not output the small-amplitude components of the range indicated by the arrows in the figure so as to reduce the noise components. As a result of this, the signal-to-noise ratio (S/N ratio) of the image data that is outputted from the image processing circuit 51 is prevented from deteriorating because of amplification of the noise components on the multiplier 42 of the succeeding stage.

The multiplier 42 multiplies each pixel value of the differential image data S30 by the gain coefficient so as to amplify it, and sends the resulted differential image data S31 to the adder 41. The delay circuit 52 causes the smoothed image data S11 to delay by the stated quantity, and sends this to the adder 41 as a delayed and smoothed image data S32.

Figure 9:
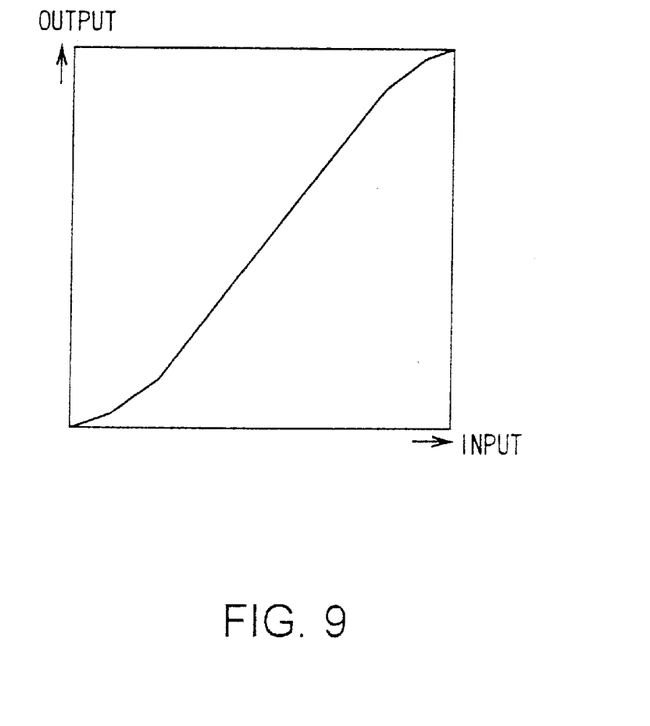
FIG. 9 is a schematic diagram used for explaining the look-up table.

The adder 41 adds each pixel value of the smoothed image data S32 that is the offset to each pixel value of the differential image data S31 that is supplied from the multiplier 42, and sends the resulted output image data S33 to a look-up table 54. The look-up table 54 applies gray level transformation, such as what is shown in FIG. 9, for compressing the vicinity of black and the vicinity of white to the output image data S33, and sends the resulted output image data S34 to the camera signal processing circuit 45. By this, generation of clipping distortion wherein the gradation become flat at the vicinity of black or at the vicinity of white is prevented, even if the pixel value exceeds the dynamic range on the black side or on the white side because of addition process of the adder 41.

In the above configuration, the image processing circuit 51 smoothes the input image data S1 with the nonlinear smoother 5, while conserving the edge components of the input image data S1, and creates the smoothed image data S11. And, the image processing circuit 51 subtracts this smoothed image data S11, as what is corresponding to the offset, from the delayed image data S15 that is the original image, multiplies the result of the subtraction by a gain coefficient, and then adds the smoothed image data S11 that is corresponding to the offset.

Therefore, it is possible to enhance the signal level of the small-amplitude components other than the edge components, while conserving the edge components out of the input image data S1, in this way, it is possible to improve the contrast of the whole image, while maintaining the dynamic range of the image, and besides it is possible to improve the sharpness of the image at also the vicinity of the edges.

According to the above configuration, by smoothing the input image data S1 while conserving the edge components of the input image data S1, thereby creating the smoothed image data S11, and then subtracting the smoothed image data S11 from the input image data S1 as that which is corresponding to the offset, and multiplying the result of the subtraction by a gain coefficient and adding the smoothed image data S11 to it, it is possible to enhance the signal level of the small-amplitude components other than the edge components out of the input image data S1, while conserving the edge components, in this way, it is possible to significantly improve the contrast and the sharpness of the whole image, in comparison with the ordinary, while maintaining the dynamic range of the image.

Besides, by lowering the noise components of the differential image data S16 on the noise elimination filter 53, it is possible to prevent the S/N ratio of the output image data S34 from deteriorating because of amplification of the noise components on the multiplier 42 of the succeeding stage. In addition, by applying gray level transformation for compressing the vicinity of black and the vicinity of white to the output image data S33 with the look-up table 54, it is possible to prevent generation of clipping distortion, even if the pixel values exceed the dynamic range.

(3) Third Embodiment

Figure 10:
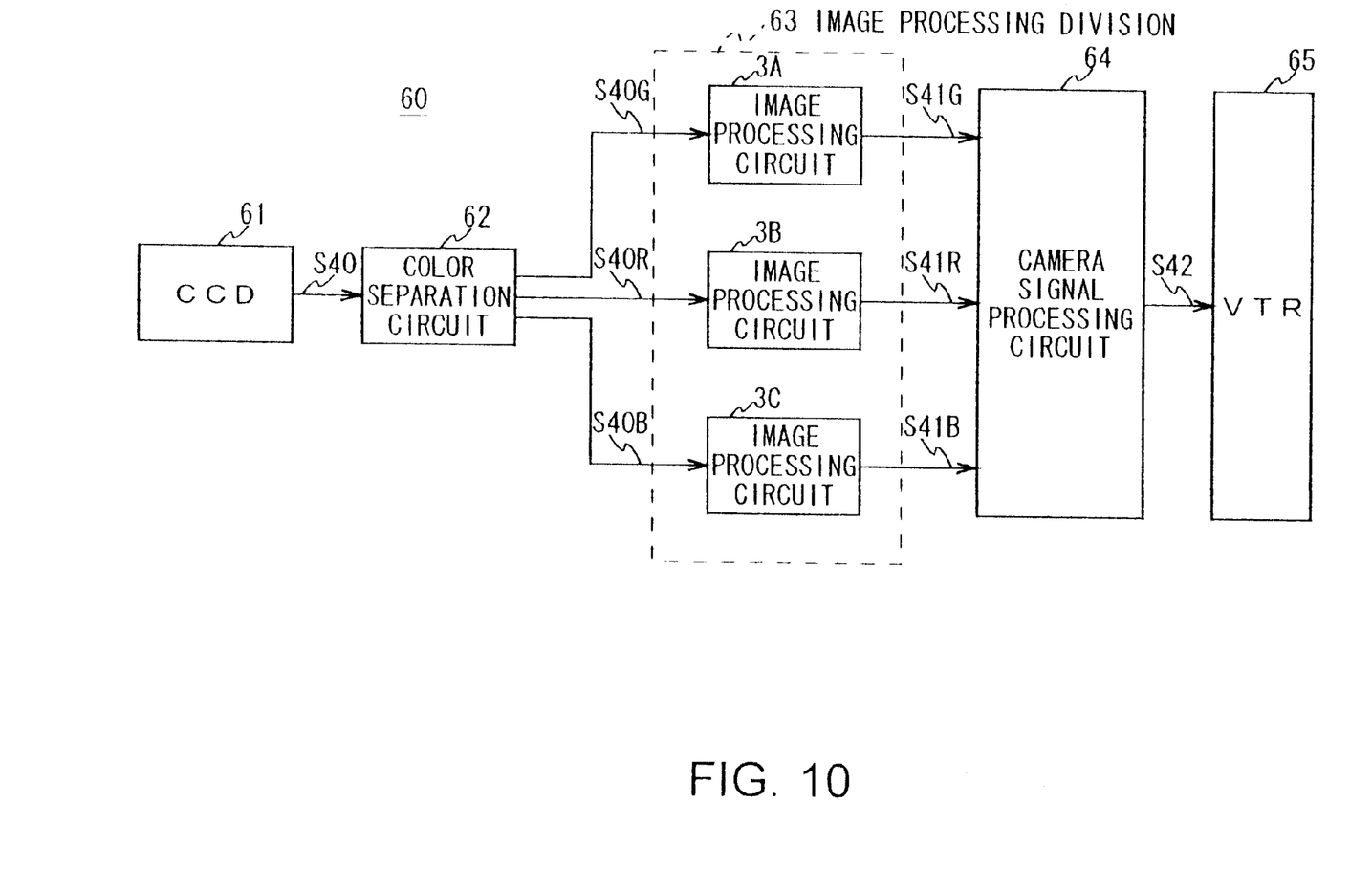
FIG. 10 is a block diagram showing a configuration of a video camera of the third embodiment.

Referring to FIG. 10, a video camera 60, which is generally designated as 60, of the third embodiment captures a color image by means of a CCD 61, and inputs the captured color image in a color separation circuit 62 as an input image data S40. The color separation circuit 62 separates this input image data S40 into three primary colors image data of R (red), G (green), and B (blue), and then it inputs the green image data out of this to an image processing circuit 3A of an image processing division 63 as the green image data S40G, inputs the red image data to an image processing circuit 3B of the image processing division 63 as the red image data S40R, and inputs the blue image data to an image processing circuit 3C of the image processing division 63 as the blue image data S40B.

The image processing circuits 3A to 3C are respectively having the same configuration as that of the image processing circuit 3 shown in FIG. 1, and are respectively adapted to apply the process of enhancing the signal level of the small-amplitude components other than the edge components while conserving the edge components to the inputted image data S40G, S40R and S40B.

That is, the image processing circuit 3A smoothes the green image data S40G while conserving the edge components of the green image data S40G, so as to create the smoothed green image data, then subtracts the smoothed green image data from the green image data S40G as that which is corresponding to the offset, and multiplies the result of the subtraction by a gain coefficient, and adds the smoothed green image data to it, and hereby generates the green output image data S41G and sends it to a camera signal processing circuit 64.

In the same way as the image processing circuit 3A, the image processing circuits 3B and 3C respectively apply the above-mentioned processing to the red image data S40R and the blue image data S40B, and hereby generate the red output image data S41R and the blue output image data S41B and respectively send them to the camera signal processing circuit 64.

The camera signal processing circuit 64 applies the stated data processing to each of the green output image data S41G, the red output image data S41R, and the blue output image data S41B, and then sends the resulted output image data S42 to a VTR 65 and records.

In the above configuration, the image processing circuits 3A to 3C respectively smooth the image data S40G, S40R and S40B while conserving the edge components of the image data S40G, S40R and S40B, so as to create the smoothed image data. And, the image processing circuits 3A to 3C subtract the smoothed image data, as what is corresponding to the offset, from the image data S40G, S40R and S40B that are the original image, multiply the result of the subtraction by the gain coefficient, and then respectively add the smoothed image data that are corresponding to the offset.

Therefore, it is possible to enhance the signal levels of the small-amplitude components other than the edge components out of the image data S40G, S40R and S40B, while conserving the edge components; in this way, it is possible to improve the contrast of the whole image, while maintaining the dynamic range of the image, and besides it is possible to improve the sharpness of the image at also the vicinity of the edges.

According to the above configuration, by respectively smoothing the image data S40G, S40R and S40B while conserving the edge components of the image data S40G, S40R and S40B, creating the smoothed image data hereby, then respectively subtracting the smoothed image data, as that which is corresponding to the offset, from the image data S40G, S40R and S40B, and multiplying the result of the subtraction by the gain coefficient and adding the smoothed image data, it is possible to enhance the signal level of the small-amplitude components other than the edge components out of the image data S40G, S40R and S40B, while conserving the edge components, in this way, it is possible to significantly improve the contrast and the sharpness of the whole image in comparison with the ordinary, while maintaining the dynamic range of the image.

Besides, by separating the color image that has been captured by the CCD 61 into three primary colors of R, G and B, and applying the image processing of respectively enhancing the signal levels of the small-amplitude components other than the edge components while conserving the respective edge components to the separated image data S40G, S40R and S40B, it is possible to significantly improve the contrast and the sharpness of the whole image in comparison with the ordinary, while maintaining the dynamic range of the image, even in the case where the color image is inputted.

(4) Other Embodiments

In the above-mentioned second embodiment, such an aspect has been described that the noise components are reduced from the differential image data S16 by means of the noise elimination filter 53 using the approach that is called coring; however, we do not intend to limit the present invention to such. Alternatively, the noise elimination filter may be composed of the ε-filter 12A shown in FIG. 4, and only the small-amplitude components of the differential image data S16 can be smoothed, and the noise components can be reduced hereby.

Besides, in the above-mentioned second embodiment, such an aspect has been described that the noise elimination filter 53 has been placed on the succeeding stage of the adder 40; however, we do not intend to limit the present invention to such. In brief, the noise elimination filter 53 is required to be placed on the preceding stage of the multiplier 42, and the noise elimination filter 53 can be placed on the preceding stage or the succeeding stage of the delay circuit 4.

Besides, in the above-mentioned third embodiment, such an aspect has been described that the input image data S40 have been separated into three primary colors signals of RGB by the color separation circuit 62; however, we do not intend to limit the present invention to such. Alternatively, the input image data S40 can be separated into a brightness signal Y, a color-difference signal R−Y that is obtained through subtracting the brightness signal Y from the red signal R, and a color-difference signal B−Y that is obtained through subtracting the brightness signal Y from the blue signal B.

Besides, in the above-mentioned third embodiment, such an aspect has been described that the ε-filters in the image processing circuits 3A to 3C are composed of one-dimensional or two-dimensional ε-filters; however, we do not intend to limit the present invention to such. Alternatively, they can be composed of three-dimensional ε-filters.

Figure 11:
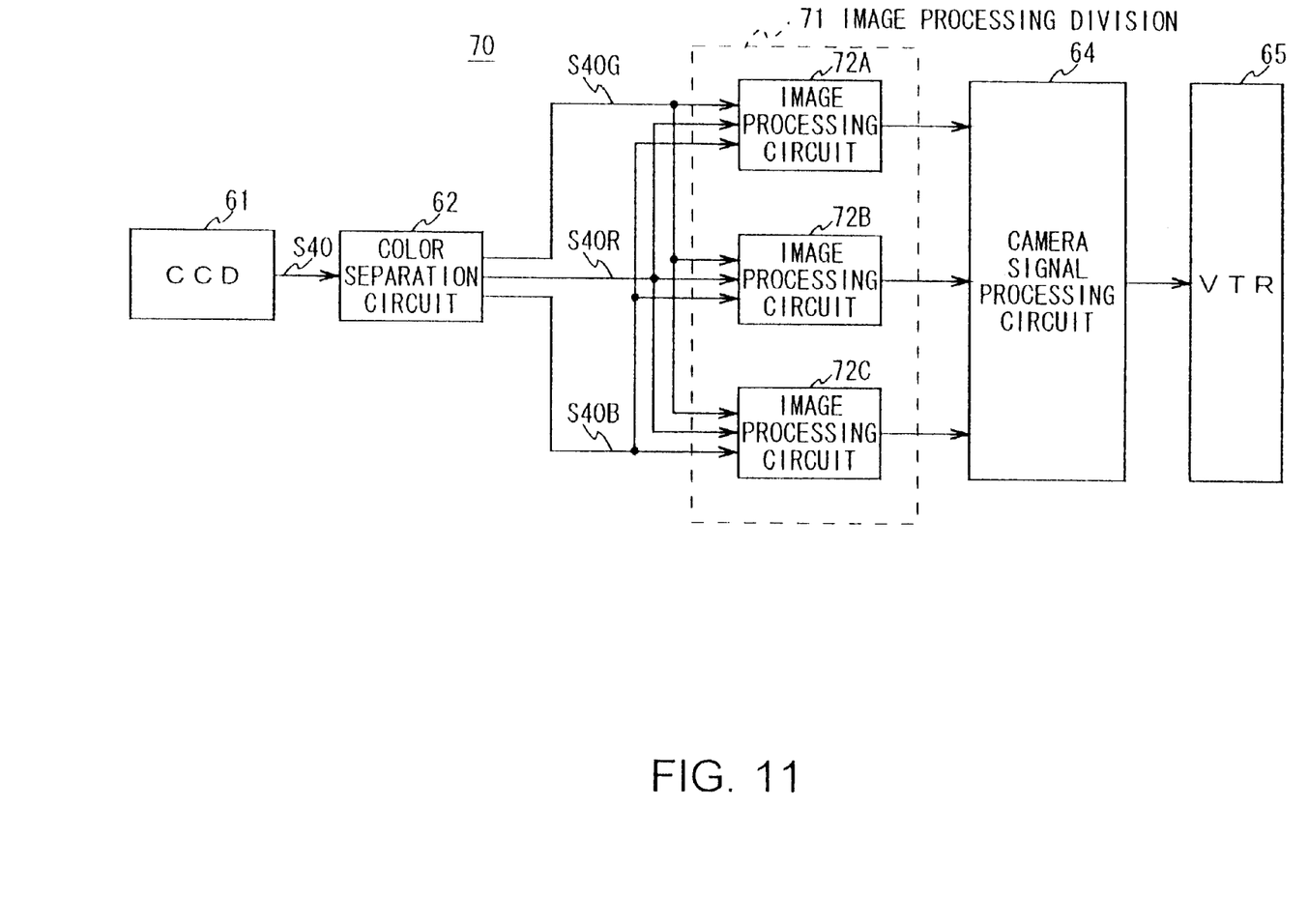
FIG. 11 is a block diagram showing a configuration of a video camera of the other embodiment.

In this case, as shown in FIG. 11 that has the same reference numerals as FIG. 10 on the corresponding portions, an image processing division 71 of a video camera 70 inputs the green image data S40G, which is supplied from the color separation circuit 62, to image processing circuits 72A to 72C, inputs the red image data S40R to the image processing circuits 72A to 72C, and inputs the blue image data S40B to the image processing circuits 72A to 72C.

By employing the next expression $$((r_n - r_{n-1})^2 + (g_n - g_{n-1})^2 + (b_n - b_{n-k})^2)^{1/2} \qquad (5),$$

instead of $|x_n - x_{n-k}|$ which is the absolute value of the difference between the pixel value $x_n$ and the pixel value $x_{n-k}$ in the above-mentioned equation (1), the image processing circuits 72A to 72C are able to perform significantly effective smoothing, where $g_n$ denotes the pixel value of the green image data S40G, and $r_n$ denotes the pixel value of the red image data S40R, and $b_n$ denotes the pixel value of the blue image data S40B.

Besides, in the above-mentioned third embodiment, such an aspect has been described that the input image data S40 have been separated into three primary colors of RGB, and the image enhancement processing have been applied to each of the separated image data S40G, S40R and S40B; however, we do not intend to limit the present invention to such. Alternatively, the image enhancement processing may be applied to only the brightness data of the input image data S40, so that the quantity of the overall operations is reduced.

Figure 12:
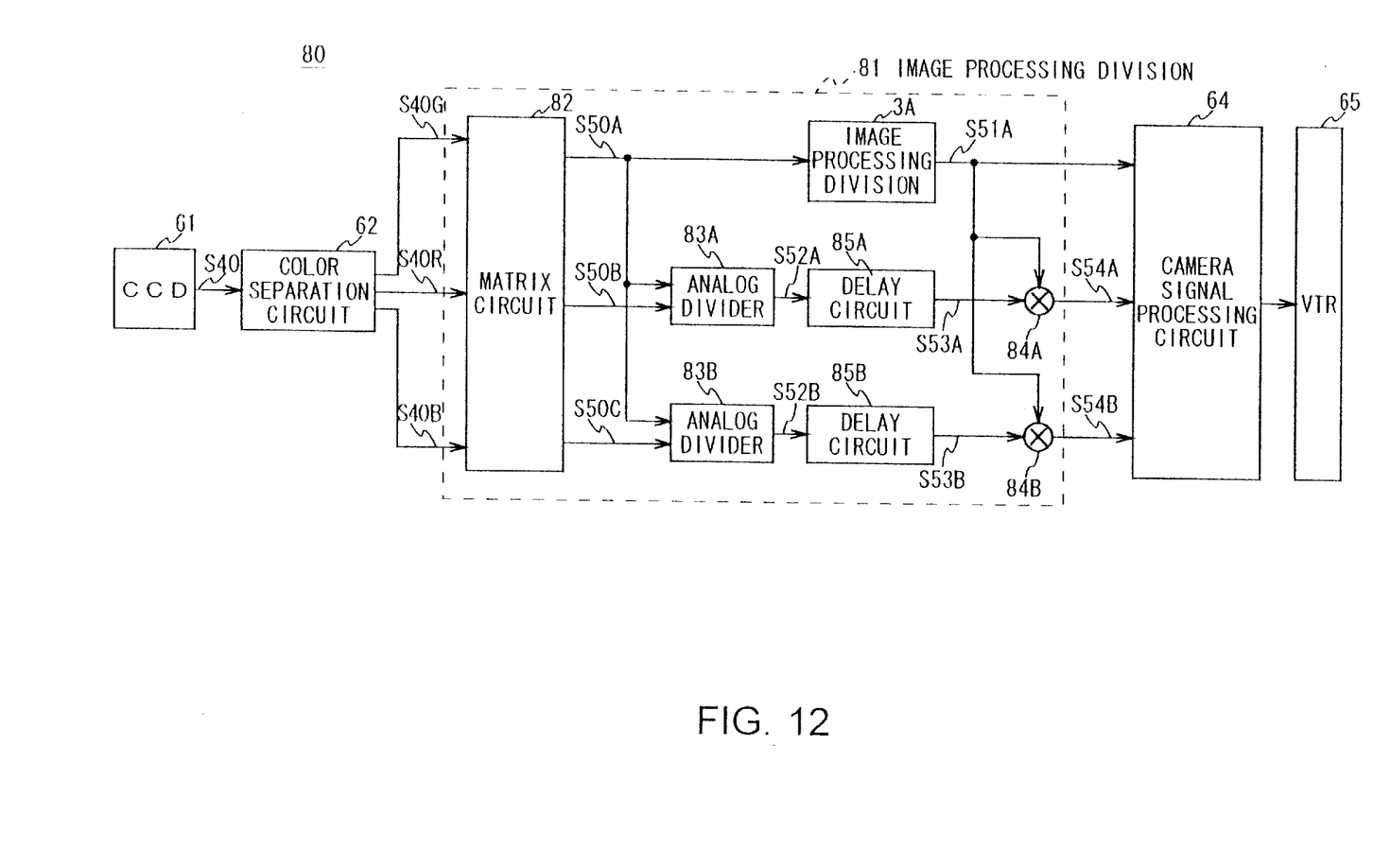
FIG. 12 is a block diagram showing a configuration of a video camera of the other embodiment.
Figure 13:
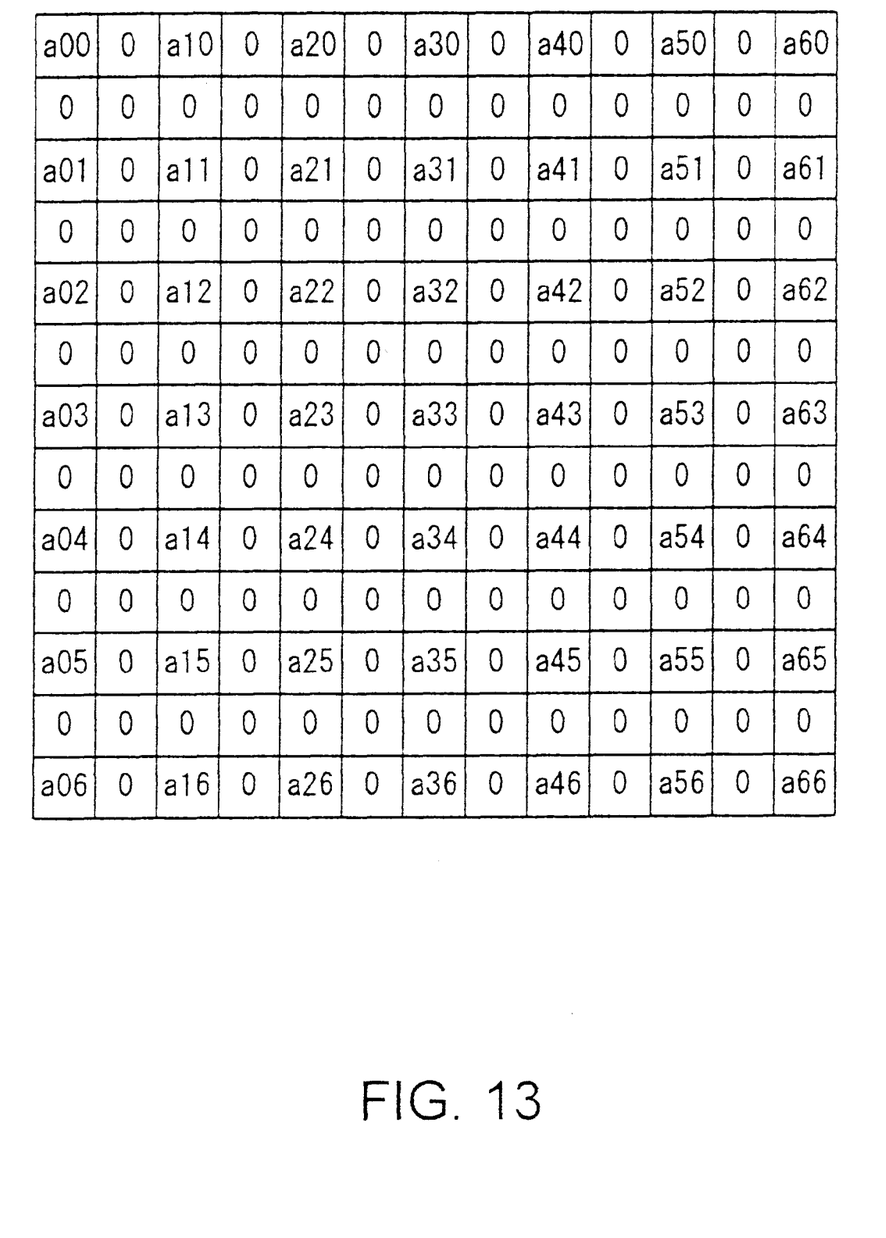
FIG. 13 is a diagram showing an example of a $\epsilon$-filter using registers 22.

As shown in FIG. 12 that has the same reference numerals as FIG. 10 on the corresponding portions, an image processing division 81 of a video camera 80 inputs the green image data S40G, the red image data S40R and the blue image data S40B which are supplied from the color separation circuit 62 to a matrix circuit 82 of the image processing division 81. The matrix circuit 82 converts the green image data S40G, the red image data S40R and the blue image data S40B into the brightness data S50A, the color-difference data S50B that is obtained by subtracting the brightness data S50A from the red image data S40R, and the color-difference data S50C that is obtained by subtracting the brightness data S50A from the blue image data S40B, and then it sends the brightness data S50A to the image processing circuit 3A and the analog dividers 83A and 83B, sends the color-difference data S50B to the analog divider 83A, and sends the color-difference data S50C to the analog divider 83B.

The image processing circuit 3A, which has the same configuration as that of the image processing circuit 3 shown in FIG. 1, applies image enhancement processing to the brightness data S50A, and then sends the resulted output brightness data S51A to multipliers 84A and 84B as well as the camera signal processing circuit 64. The analog dividers 83A and 83B respectively divide the color-difference data S50B and S50C by the brightness data S50A, and hereby respectively normalize the color-difference data S50B and S50C with the brightness data S50A, so as to generate the normalized data S52A and S52B, and then send these to the delay circuits 85A and 85B respectively.

The delay circuits 85A and 85B cause the normalized data S52A and S52B to delay by the stated quantity respectively, and then send these to the multipliers 84A and 84B, as the delayed and normalized data S53A and S53B. The multipliers 84A and 84B respectively multiply the delayed and normalized data S53A and S53B by the brightness data S51A, generate the color-difference data S54A and S54B hereby, and then send these to the camera signal processing circuit 64.

In addition, in the above-mentioned embodiments, such aspects have been described that the present invention has been applied to video cameras 1, 50 and 60; however, the present invention is applicable not merely to such, but to the other wide variety of image processing devices, such as an electronics still camera, a printer, a display unit, and a computer. In this case, in a computer, at the time of rectifying the image contrast, it is possible to obtain a high-grade contrast-rectified image, while maintaining the dynamic range; besides, at the time of synthesizing the images that have been obtained under the different lighting conditions, it is possible to correct only the difference between the respective contrast components, and to generate a natural synthetic image.

As described above, according to the present invention, it is possible to enhance and display the portions other than the edges, and so it is possible to significantly improve the contrast and the sharpness of whole image, in comparison with the usual, while conserving the edges with the pixel values which change abruptly out of input image data, by amplifying the portions other than the edges.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image processing device which comprises image processing means for, while conserving the edges with the pixel values which change abruptly out of input image data, amplifying the portions other than said edges, said image processing means comprising:

smoothing means for smoothing said input image data while conserving said edges of said input image data and for generating smoothed image data; and image enhancing means for subtracting said smoothed image data from said input image data, for amplifying the subtraction result and then adding said smoothed image data, and for generating output image data, and further said smoothing means comprising:
nonlinear converting means for performing nonlinear conversion on each of said input image data and generating nonlinear image data;
nonlinear filtering means for applying nonlinear digital filter to said nonlinear image data and generating nonlinear smoothed image data; and
nonlinear inverting means for performing inversion of said nonlinear converting means on said nonlinear smoothed image data and generating smoothed image data.

2. The image processing device according to claim 1 wherein said nonlinear filtering means adaptively changes the degree of smoothing based on the difference values between a central pixel and a pixel close thereto.

3. The image processing device according to claim 1 wherein said nonlinear converting means converts the value of said input image data so that the amount of said difference values may not rely upon the intensity of lighting when said image data is captured.

4. The image processing device according to claim 1 wherein said nonlinear filtering means is comprised of a plurality of nonlinear filters of different sizes connected in series.

5. The image processing device according to claim 1 wherein said nonlinear filtering means is comprised of a plurality of nonlinear filters of different sizes connected in series and smaller filters are positioned in latter parts.

6. An image processing method for performing image processing of, while conserving the edges with the pixel values which change abruptly out of input image data, amplifying the portions other than said edges, comprising the steps of:

smoothing said Input image data while conserving said edges of said input image data and generating smoothed image data; and subtracting said smoothed image data from said input image data, amplifying the subtraction result and then adding said smoothed image data, and generating output image data, and further comprising the steps of:
eliminating the noise components out of said input image data, thereby generating noise-eliminated image data; and
subtracting said smoothed image data from said noise-eliminated image data, amplifying the subtraction result and then adding said smoothed image data, thereby generating output image data, and further yet comprising the steps of:

performing nonlinear conversion on each of said input image data and generating nonlinear image data;

applying nonlinear digital filter to said nonlinear image data and generating nonlinear smoothed image data; and performing inversion of said nonlinear converting means on said nonlinear smoothed image data and generating smoothed image data.

7. The image processing method according to claim 6 wherein the degree of smoothing is adaptively changed based on the difference values between a central pixel and a pixel close thereto and said nonlinear smoothed image data is generated.

8. The image processing method according to claim 6 wherein the value of said input image data is converted so that the amount of said difference values may not rely upon the intensity of lighting when said image data is captured.

9. The image processing method according to claim 6 wherein a plurality of nonlinear filters of different sizes are applied in series to said nonlinear image data and said nonlinear smoothed image data is generated.

10. The image processing method according to claim 6 wherein a plurality of nonlinear filters of different sizes are applied in series to said nonlinear image data from the filters with larger sizes in turn and said nonlinear smoothed image data is generated.

* * * * *